(12) United States Patent
Koroyasu et al.

(10) Patent No.: US 11,041,557 B2
(45) Date of Patent: Jun. 22, 2021

(54) SPEED REDUCER WITH ELECTRIC MOTOR

(71) Applicants: NIDEC-SHIMPO CORPORATION, Kyoto (JP); NIDEC COPAL ELECTRONICS CORPORATION, Tokyo (JP)

(72) Inventors: Takashi Koroyasu, Kyoto (JP); Tomoyuki Otsuka, Kyoto (JP); Takuro Yonemura, Kyoto (JP); Takao Ikeda, Tokyo (JP)

(73) Assignees: NIDEC-SHIMPO CORPORATION, Kyoto (JP); NIDEC COPAL ELECTRONICS CORPORATION, Tokyo (JP)

( * ) Notice: Subject to any disclaimer, the term of this patent is extended or adjusted under 35 U.S.C. 154(b) by 122 days.

(21) Appl. No.: 16/485,446

(22) PCT Filed: Feb. 15, 2018

(86) PCT No.: PCT/JP2018/005248
§ 371 (c)(1),
(2) Date: Aug. 13, 2019

(87) PCT Pub. No.: WO2018/151210
PCT Pub. Date: Aug. 23, 2018

(65) Prior Publication Data
US 2020/0003256 A1 Jan. 2, 2020

(30) Foreign Application Priority Data

Feb. 17, 2017 (JP) .............................. JP2017-027438

(51) Int. Cl.
*F16H 49/00* (2006.01)
*F16C 19/36* (2006.01)
(Continued)

(52) U.S. Cl.
CPC ........... *F16H 49/001* (2013.01); *F16C 19/36* (2013.01); *F16C 19/52* (2013.01); *F16H 1/32* (2013.01);
(Continued)

(58) Field of Classification Search
CPC ..................................................... F16H 49/001
(Continued)

(56) References Cited

U.S. PATENT DOCUMENTS 7,566,198 B2 * 7/2009 Yazawa .................... B25J 9/042
318/568.16
8,863,930 B2 * 10/2014 Kitahara .................. G05G 5/04
192/138
(Continued)

FOREIGN PATENT DOCUMENTS

JP 2006200984 8/2006
JP 2008068725 3/2008
(Continued)

OTHER PUBLICATIONS

"International Search Report (Form PCT/ISA/210) of PCT/JP2018/005248," dated May 1, 2018, with English translation thereof, pp. 1-4.

*Primary Examiner* — Ha Dinh Ho
(74) *Attorney, Agent, or Firm* — JCIPRNET (57) ABSTRACT

This speed reducer with an electric motor has: a hollow shaft; a casing fixed to the hollow shaft; a fixed part that is relatively stationary with respect to the casing; an electric motor; a speed reduction mechanism; an output part; and a torque sensor that is connected to the casing and the fixed part. The torque sensor has an elastically deformable strain body that has an annular outer ring and an annular inner ring and a plurality of strain sensors. The outer ring and the inner ring are respectively located at an end portion on the radial (Continued)

outside and the radial inside of the torque sensor and is connected to one of the casing and the fixed part. Each of the plurality of strain sensors is at least partially located in a radial direction between the outer ring and the inner ring.

20 Claims, 6 Drawing Sheets

(51) Int. Cl.
    *F16C 19/52*     (2006.01)
    *F16H 1/32*     (2006.01)
    *F16C 41/00*     (2006.01)
    *F16H 57/02*     (2012.01)

(52) U.S. Cl.
    CPC .... *F16C 41/00* (2013.01); *F16H 2057/02034* (2013.01)

(58) Field of Classification Search
    USPC .......................................................... 74/640
    See application file for complete search history.

(56) References Cited

U.S. PATENT DOCUMENTS

| 9,064,919 | B2 * | 6/2015 | Yazawa | ............. H01L 21/67766 |
| 9,278,450 | B2 * | 3/2016 | Kitahara | ................ B25J 9/1692 |

FOREIGN PATENT DOCUMENTS

| JP | 2012228754 | 11/2012 |
| JP | 2013215081 | 10/2013 |
| JP | 5947494 | 7/2016 |
| WO | 2007082954 | 7/2007 |
| WO | 2015020089 | 2/2015 |
| WO | 2017012626 | 1/2017 |

\* cited by examiner

SPEED REDUCER WITH ELECTRIC MOTOR

CROSS-REFERENCE TO RELATED APPLICATION

This application is a 371 application of the international PCT application serial no. PCT/JP2018/005248, filed on Feb. 15, 2018, which claims the priority benefit of Japan application no. 2017-027438, filed on Feb. 17, 2017. The entirety of each of the above-mentioned patent applications is hereby incorporated by reference herein and made a part of this specification.

BACKGROUND OF THE INVENTION

1. Technical Field

The present invention relates to a speed reducer with an electric motor.

2. Related Art

Figure 6:
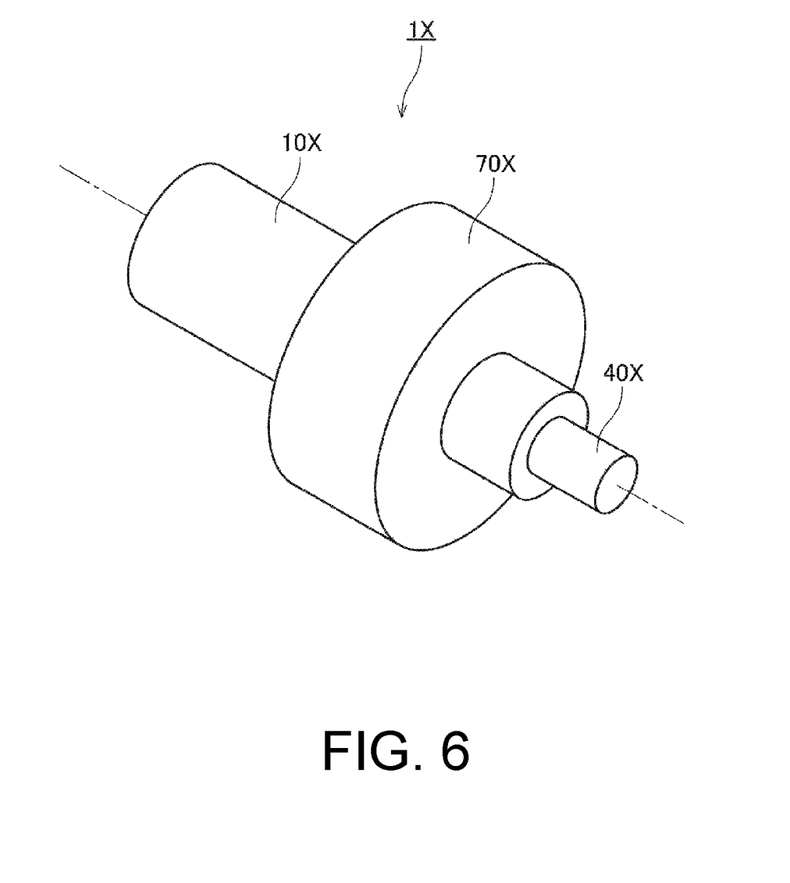
FIG. 6 is a conceptual diagram of a conventional speed reducer with an electric motor.

Conventionally, a speed reducer with an electric motor is known, which includes an electric motor and a speed reducer and which decelerates and outputs power obtained from the electric motor. FIG. 6 is a diagram conceptually showing a structure of a conventional speed reducer with an electric motor 1X. The speed reducer with an electric motor 1x of FIG. 6 includes an electric motor 10X, a speed reduction mechanism 70X, and an output part 40X that rotates at a rotation speed after deceleration. The speed reducer with an electric motor 1X is built into a joint part of an arm in a work robot for example. Therefore, a mechanism which can detect an external force applied to the output part in the speed reducer with an electric motor 1X is required.

In order to detect the external force applied to the output part of the speed reducer with an electric motor, for example, it is considered to mount a sensor on the speed reducer with an electric motor. The mechanism which uses the sensor to detect a load acting on the speed reducer with an electric motor is described, for example, in Japanese Laid-Open No. 2008-068725.

LITERATURE OF RELATED ART

Patent Literature

Patent literature 1: Japanese Laid-Open publication No. 2008-068725

SUMMARY

Problems to be Solved

In Japanese Laid-Open publication No. 2008-068725, a structure of a sensor unit is shown, in which strains of a bearing that supports a hub of a wheel rotated via a speed reducer by an electric motor are detected and thereby a force acting on a contacting point between the wheel and a road surface is measured. However, the sensor unit is configured to detect the strains in a peripheral part of the bearing, and thus it is difficult to detect a torque around a center axis.

An objective of the present invention is to provide a structure in which a load applied to the output part and including the torque around the center axis can be detected in a speed reducer with an electric motor.

Means to Solve Problems

An exemplary first invention of this application is a speed reducer with an electric motor having: a hollow shaft that is hollow and extends in an axial direction around a first center axis; a tubular casing that is directly or indirectly fixed to the hollow shaft and extends in the axial direction on a radial outside of the hollow shaft; a fixed part that expands around the hollow shaft and is relatively stationary with respect to the casing; an electric motor that generates a rotation motion with respect to a second center axis parallel to a first center axis on the radial outside of the hollow shaft; a speed reduction mechanism that decelerates and transmits the rotation motion obtained from the electric motor; an output part that is rotatably connected to the fixed part via the first bearing and rotates with respect to the first center axis at a rotation speed that has been decelerated by the speed reduction mechanism; and a torque sensor that expands around the hollow shaft and is connected to the casing and the fixed part. The torque sensor has an elastically deformable strain body that has an annular first outer ring and an annular first inner ring and a plurality of strain sensors. The first outer ring is located at an end portion on the radial outside of the torque sensor and is connected to one of the casing and the fixed part. The first inner ring is located at an end portion on the radial inside of the torque sensor and is connected to the other of the casing and the fixed part. Each of the plurality of strain sensors is at least partially located in the radial direction between the first outer ring and the first inner ring.

Effect

According to the exemplary first invention of this application, the torque sensor that expands around the hollow shaft extending in the axial direction is included, and the first outer ring and the first inner ring of the torque sensor are respectively connected to the casing and the fixed part that is connected to the output part via the bearing, thereby a load applied to the output part and including the torque around the center axis can be detected.

DESCRIPTION OF THE EMBODIMENTS

An exemplary embodiment of the present invention is described below with reference to the drawings. Besides, in this application, a direction parallel to a center axis (a first center axis) of the hollow shaft is referred to as an "axial direction", a direction orthogonal to the center axis (the first center axis) is referred to as a "radial direction", and a direction along an arc about the center axis (the first center axis) is referred to as a "peripheral direction". However, the "parallel direction" also includes a substantially parallel direction. In addition, the "orthogonal direction" also includes a substantially orthogonal direction. In addition, in the following, for convenience of description, a right side of FIG. 1 on which an electric motor is disposed is referred to as an "input side", and a left side of FIG. 1 on which an output part is disposed is referred to as an "output side". However, there is no intention to limit an orientation during use of a speed reducer with an electric motor of the present invention by this definition.

1. First Embodiment

<1-1. Constitution of Speed Reducer with an Electric Motor>

Figure 1:
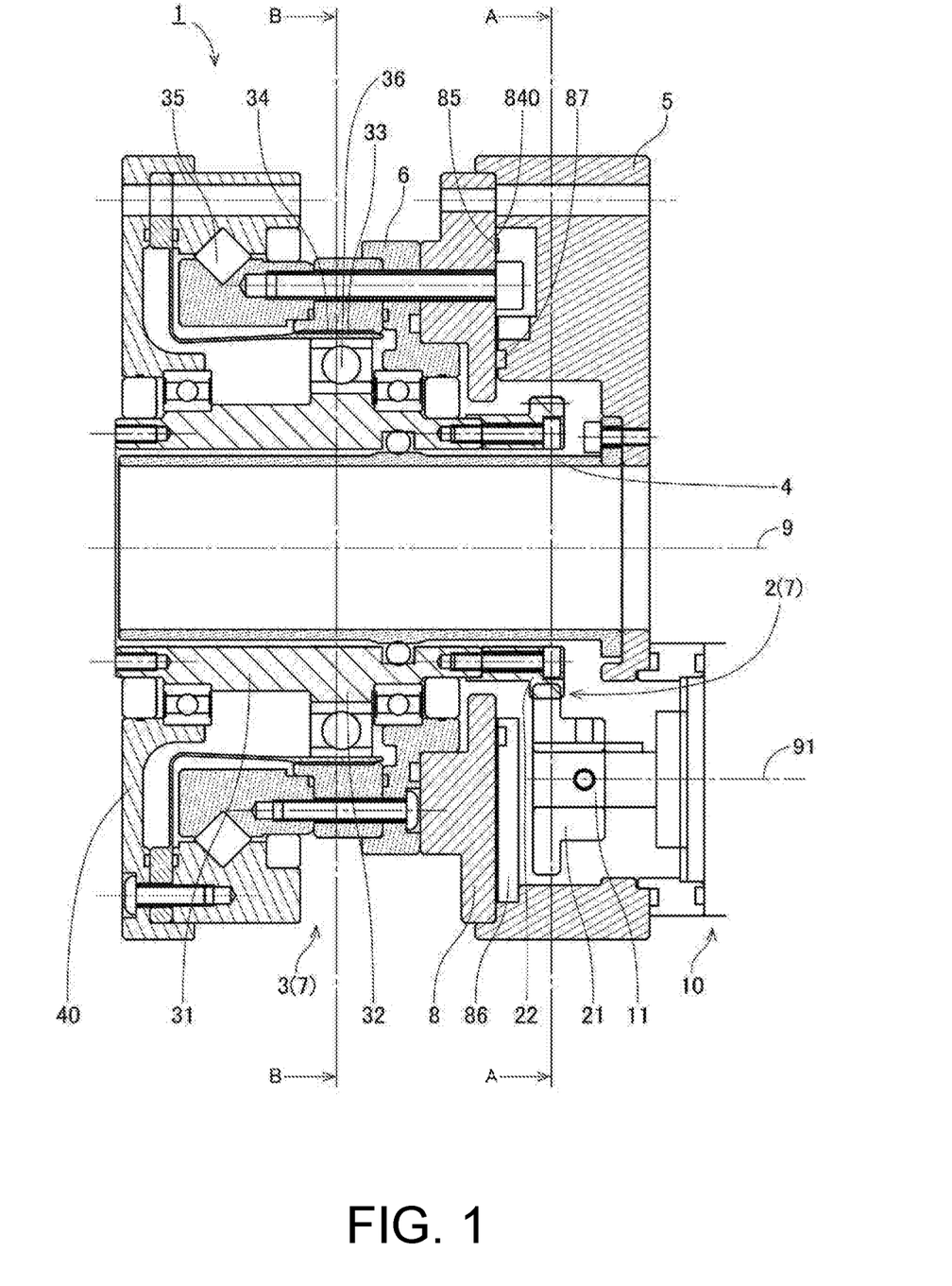
FIG. 1 is a longitudinal cross-section view of a speed reducer with an electric motor of a first embodiment.

FIG. 1 is a longitudinal cross-section view of a speed reducer with an electric motor 1 of a first embodiment of the present invention. In the speed reducer with an electric motor 1, a speed reduction mechanism 7 constituted by a spur gear mechanism 2 and a wave gear mechanism 3 is used. The spur gear mechanism 2 is a mechanism in which a first gear 21 and external teeth of a second gear 22 that has more external teeth than the first gear 21 engage with each other and rotate in conjunction. The wave gear mechanism 3 is a mechanism in which an elastic flexible external gear 33 partially engages with a rigid internal gear 34, and the engagement position is moved in the peripheral direction due to a difference in number of teeth of the two gears by utilizing the elastic flexibility. The details are described later.

The speed reducer with an electric motor 1 is a mechanism which converts a rotation motion of a first rotation speed of a rotation shaft 11 in an electric motor 10 to a rotation motion of a second rotation speed which is lower than the first rotation speed by the spur gear mechanism 2, and further to a rotation motion of a third rotation speed which is lower than the second rotation speed by the wave gear mechanism 3 to rotate an output part 40. The speed reducer with an electric motor 1 is built into a joint part of an arm in a work robot for example, and is used to implement a bending and stretching motion of the arm. However, the speed reducer with an electric motor of the present invention may also be built into other equipment such as an assist suit, a turn table, an indexing table for machine tool, a wheelchair, an automatic guided vehicle and the like to implement various rotation motions.

As shown in FIG. 1, the speed reducer with an electric motor 1 of the embodiment includes the electric motor 10, a hollow shaft 4, a casing 5, a fixed part 6, the speed reduction mechanism 7, the output part 40, and a torque sensor 8 described later.

The electric motor 10 is a driving source which generates a rotation motion corresponding to a driving current. The electric motor 10 is disposed on the radial outside of the hollow shaft 4 described later. In addition, the electric motor 10 includes a stationary part having a stator and a rotation part having a magnet. The stationary part is directly or indirectly fixed to the casing 5 described later and is relatively stationary. In addition, the rotation part is supported so as to be capable of rotating with respect to the stationary part about a second center axis 91 parallel to a first center axis 9.

When the driving current is supplied to a coil included in the stationary part, magnetic flux is generated in a plurality of teeth which are magnetic cores of the coil. Then, by an action of the magnetic flux between the teeth and the magnet included in the rotation part, a peripheral torque is generated between the stationary part and the rotation part, and the rotation part rotates with respect to the stationary part about the second center axis 91. Thereby, the rotation motion with respect to the second center axis 91 can be generated on the radial outside of the hollow shaft 4. In addition, a rotation shaft 11 which is a part of the rotation part of the electric motor 10 and extends along the second center axis 91 rotates about the second center axis 91 at the first rotation speed. Besides, by disposing the electric motor 10 on the radial outside of the hollow shaft 4, a hollow structure can be easily arranged around the first center axis 9 in the speed reducer with an electric motor 1. Thereby, wires drawn from each part constituting the speed reducer with an electric motor 1 can be arranged together inside the hollow structure.

The hollow shaft 4 is a hollow (cylindrical) member which extends in the axial direction around the first center axis 9 extending from the input side to the output side in the speed reducer with an electric motor 1. The hollow shaft 4 and the casing 5 described later are relatively stationary with respect to a housing in which the speed reducer with an electric motor 1 is disposed.

The casing 5 is a tubular member which extends in the axial direction in the radial outside of the hollow shaft 4. The casing 5 of the embodiment is directly fixed to the hollow shaft 4 by screwing. However, the casing 5 may also be indirectly fixed to the hollow shaft 4 via other members. Furthermore, the stationary part of the electric motor 10 is fixed to the casing 5.

The fixed part 6 is a member which expands around the hollow shaft 4. The fixed part 6 is located nearer to the output side than the casing 5. The fixed part 6 is fixed to the casing 5 via the torque sensor 8 described later. In addition, the fixed part 6 is rotatably connected to the output part 40 described later via a first bearing 35.

The speed reduction mechanism 7 is a mechanism by which the rotation motion obtained from the electric motor 10 is decelerated and transmitted to the output part 40. The speed reduction mechanism 7 includes the spur gear mechanism 2 and the wave gear mechanism 3.

Figure 2:
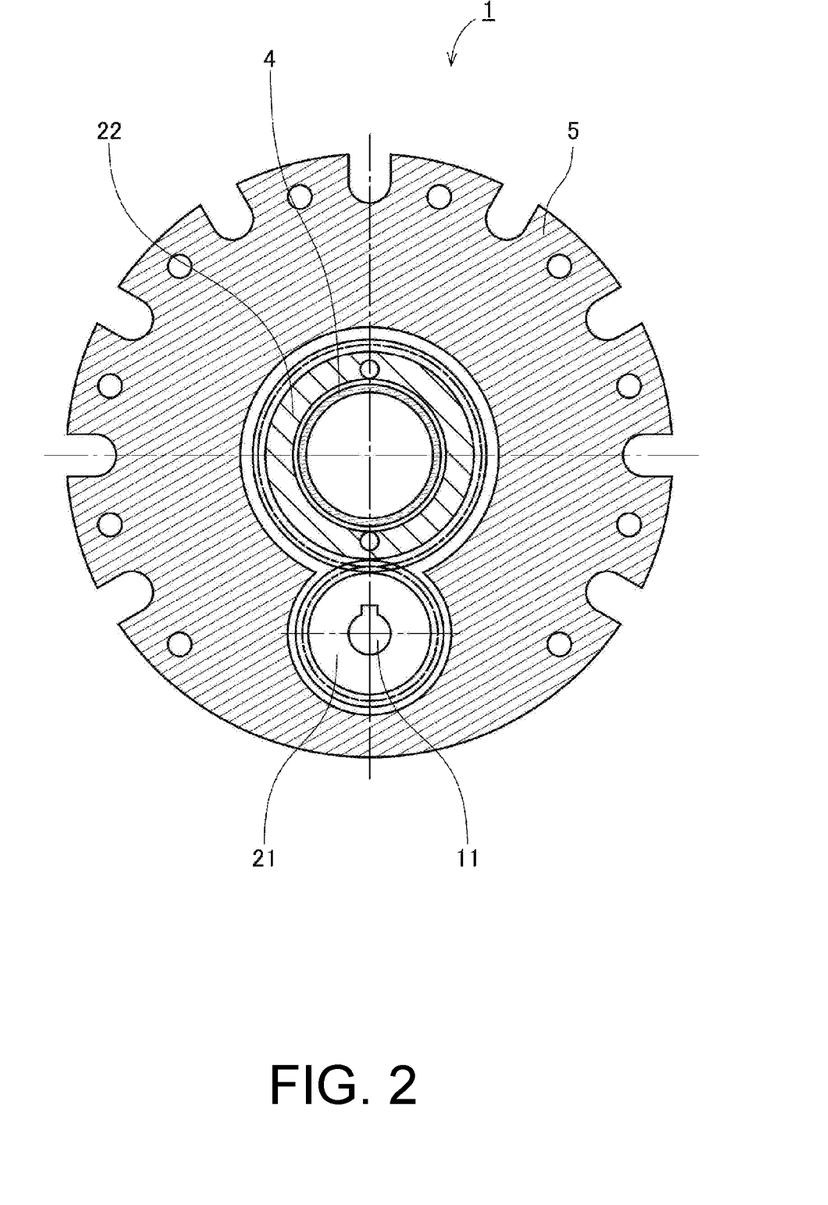
FIG. 2 is a transverse cross-section view of the speed reducer with an electric motor of the first embodiment.

FIG. 2 is a transverse cross-section view of the speed reducer with an electric motor 1 observed from a position A-A of FIG. 1. In FIG. 2, an illustration of the external teeth of the first gear 21 and the second gear 22 included in the spur gear mechanism 2 is omitted. As shown in FIG. 1 and FIG. 2, the spur gear mechanism 2 includes the first gear 21 and the second gear 22. The first gear 21 is a spur gear which is fixed to an outer peripheral surface of the rotation shaft 11 of the electric motor 10. The first gear 21 rotates along with the rotation shaft 11 about the second center axis 91 at the first rotation speed. The second gear 22 is a spur gear which annularly expands on the radial outside of the hollow shaft 4. The second gear 22 engages with the first gear 21 and rotates about the first center axis 9. However, the number of external teeth arranged on the second gear 22 is larger than the number of external teeth arranged on the first gear 21. Therefore, in response to the first gear 21 rotating about the second center axis 91 at the first rotation speed, the second gear 22 rotates along with a tubular part 31 described later about the first center axis 9 at the second rotation speed after the deceleration and lower than the first rotation speed around the hollow shaft 4.

Besides, lubricating oil such as grease (not shown) is retained in a contact section between the first gear 21 and the second gear 22. Thereby, friction and wear caused by the engagement between the first gear 21 and the second gear 22 are suppressed.

Figure 3:
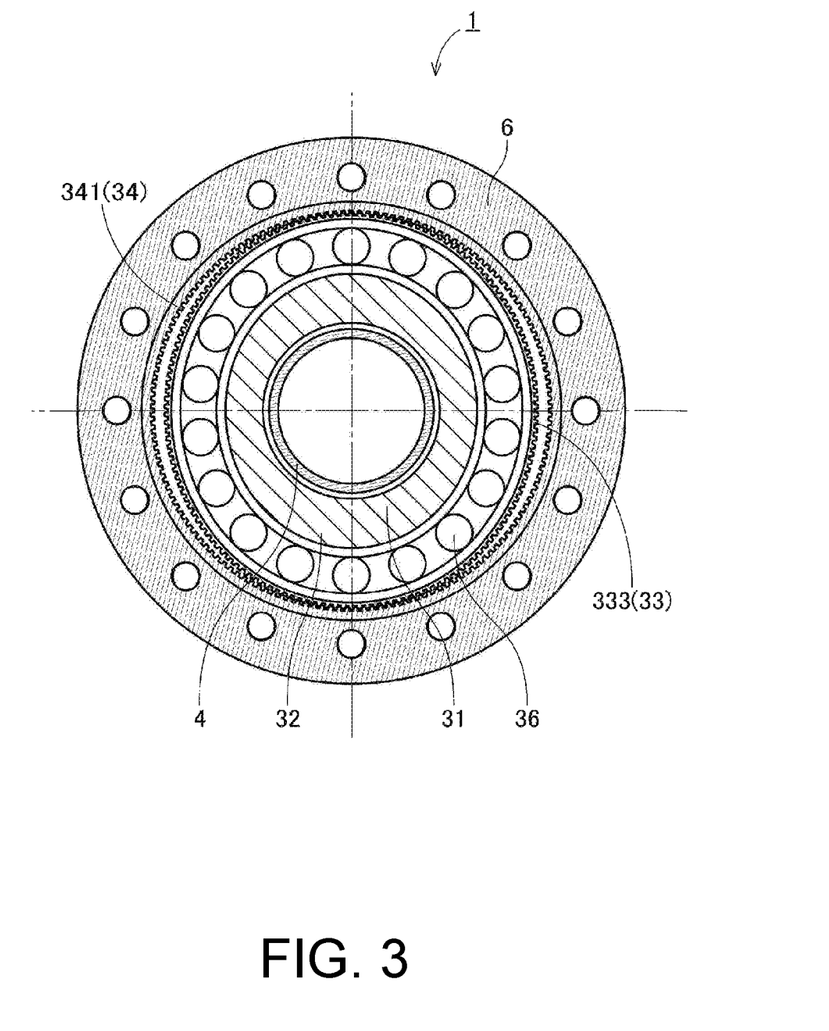
FIG. 3 is a transverse cross-section view of the speed reducer with an electric motor of the first embodiment.
Figure 4:
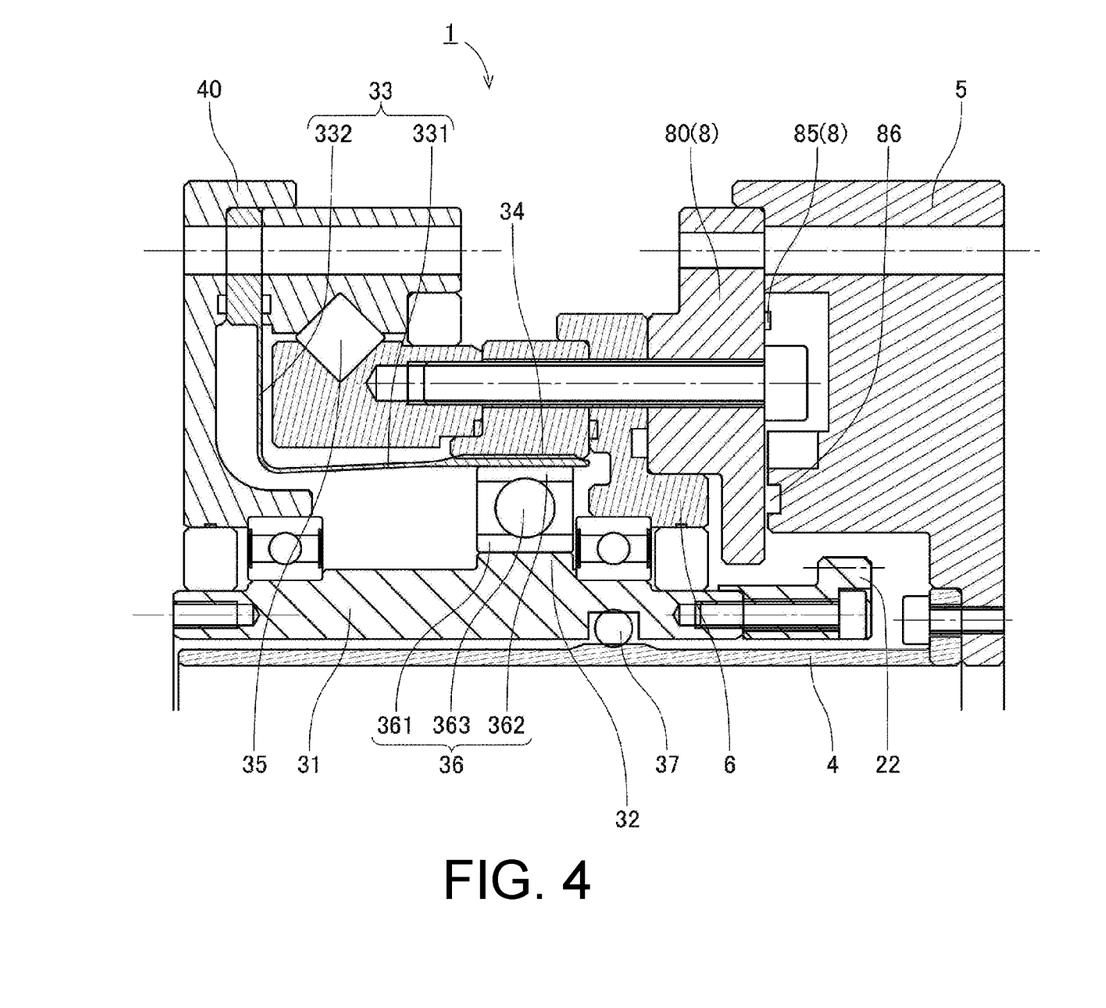
FIG. 4 is a partial longitudinal cross-section view of the speed reducer with an electric motor of the first embodiment.

FIG. 3 is a transverse cross-section view of the speed reducer with an electric motor 1 observed from a position B-B of FIG. 1. FIG. 4 is a partial longitudinal cross-section view of the speed reducer with an electric motor 1 of the first embodiment. As shown in FIG. 1, FIG. 3, and FIG. 4, the wave gear mechanism 3 of the speed reducer with an electric motor 1 is a gear mechanism utilizing a flexible gear. The wave gear mechanism 3 includes a tubular part 31, a noncircular cam 32, a flexible external gear 33, and a second bearing 36. In addition, in the embodiment, the wave gear mechanism 3 further includes the internal gear 34.

The tubular part 31 is a tubular member which extends in the axial direction around the hollow shaft 4. In addition, an inner peripheral surface of the tubular part 31 is rotatably supported by the hollow shaft 4 across the third bearing 37. Furthermore, the tubular part 31 is adjacent to the second gear 22 in the axial direction and fixed by screwing, and rotates along with the second gear 22 about the first center axis 9 at the second rotation speed.

The noncircular cam 32 is a noncircular annular section arranged on the outer peripheral surface of the tubular part 31. In the embodiment, the noncircular cam 32 is integrated with the tubular part 31. As shown in FIG. 3, the noncircular cam 32 is in an elliptical shape observed in the axial direction, and has an outer peripheral surface where a distance from the first center axis 9 is not constant. The noncircular cam 32 rotates along with the tubular part 31 about the first center axis 9 at the second rotation speed.

The flexible external gear 33 includes a flexible tube part 331 and a flange part 332. The flexible tube part 331 is a tubular section disposed on the radial inside of the internal gear 34 described later. As described later, the flexible tube part 331 deforms corresponding to the rotation of the noncircular cam 32. On the outer peripheral surface of the flexible tube part 331, a plurality of external teeth 333 are arranged at a constant pitch. The flange part 332 extends from an end portion in the axial direction of the flexible tube part 331 to the radial outside. The flange part 332 is fixed to the output part 40 by screwing for example. In this way, the flexible external gear 33 has a so-called open structure, and a hollow structure is easily formed in the speed reducer with an electric motor 1.

The second bearing 36 is a flexible bearing which is interposed in the radial direction between the noncircular cam 32 and the flexible external gear 33. The second bearing 36 includes a second inner ring 361, a second outer ring 362, and a plurality of spheres 363 interposed between the second inner ring 361 and the second outer ring 362. The second inner ring 361 and an elliptical outer peripheral surface of the noncircular cam 32 are fixed to each other. In addition, the second outer ring 362 and an inner peripheral surface of the flexible external gear 33 are fixed to each other. Besides, the second inner ring 361 and the noncircular cam 32 may be constituted by a single member. In addition, the second outer ring 362 and the flexible external gear 33 may be constituted by a single member.

The internal gear 34 is a toric member which is at least partially located on the radial outside of the flexible external gear 33. The internal gear 34 is fixed to the fixed part 6 by screwing. Besides, the internal gear 34 may not be arranged separately from the fixed part 6 but be formed on the inner peripheral surface of the fixed part 6. On the inner peripheral surface of the internal gear 34, a plurality of internal teeth 341 are arranged at a constant pitch in the peripheral direction.

The output part 40 is a toric member which is disposed on the output side of the casing 5 on the radial outside of the hollow shaft 4. The output part 40 is fixed to the flange part 332 of the flexible external gear 33 by screwing. In addition, the first bearing 35 is interposed between the output part 40 and the fixed part 6. Thereby, the output part 40 is rotatably connected to the fixed part 6 via the first bearing 35.

Besides, in the embodiment, a cross roller bearing is used in the first bearing 35. The first bearing 35 has a plurality of cylindrical rollers (not shown) between the inner peripheral surface of the output part 40 and the outer peripheral surface of the fixed part 6. The plurality of cylindrical rollers are disposed, with the orientation changed alternately, between an annular V-groove (not shown) arranged on the inner peripheral surface of the output part 40 and an annular V-groove (not shown) arranged on the outer peripheral surface of the fixed part 6. Thereby, the rotation of the output part 40 with respect to the fixed part 6 is allowed and the connection is in high rigidity.

Even if such a cross roller bearing is not used in pairs as ball bearings, a necessary rigidity can be obtained in the axial direction and the radial direction. That is, by using the cross roller bearing, the number of bearings interposed between the fixed part 6 and the output part 40 can be reduced. Thereby, the weight of the first bearing 35 can be reduced, and the dimension in the axial direction of the first bearing 35 can be controlled.

Besides, in the embodiment, a part of the output part 40 including the inner peripheral surface functions as an outer ring of the first bearing 35. However, the first bearing 35 may have an outer ring separate from the output part 40. In addition, in the embodiment, a part of the fixed part 6 including the outer peripheral surface functions as an inner ring of the first bearing 35. However, the first bearing 35 may have an inner ring separate from the fixed part 6.

When the noncircular cam 32 rotates along with the tubular part 31 at the second rotation speed, the shape of the flexible tube part 331 of the flexible external gear 33 changes corresponding to the rotation of the noncircular cam 32. That is, when observed in the axial direction, the flexible tube part 331 is formed into an elliptical shape along the shape of the outer peripheral surface of the noncircular cam 32 across the second bearing 36. A long axis of this ellipse follows the rotation of the noncircular cam 32 and moves in the peripheral direction. In the flexible external gear 33, only the external teeth 333 located at two ends of the long axis within the plurality of external teeth 333 arranged on the outer peripheral surface engage with the internal teeth 341 of the internal gear 34.

In this way, the plurality of external teeth 333 of the flexible external gear 33 engage with the plurality of internal teeth 341 of the internal gear 34 only in a part of the peripheral direction. Then, the engagement position is moved in the peripheral direction corresponding to the rotation of the noncircular cam 32. However, the number of the external teeth 333 arranged on the flexible external gear 33 and the number of the internal teeth 341 arranged on the internal gear 34 are different from each other. Therefore, in each rotation of the noncircular cam 32, the position of the internal teeth 341 of the internal gear 34 engaging with the external teeth 333 in the same position of the flexible external gear 33 is shifted. Thereby, the flexible external gear 33 slowly rotates about the first center axis 9. In other words, the flexible external gear 33 and the internal gear 34 engage with each other and relatively rotate due to a difference in the number of teeth. The rotation speed of the flexible external gear 33 at this time is a third rotation speed which is lower than the rotation speed of the noncircular cam 32. The output part 40 rotates along with the flexible external gear 33 with respect to the first center axis 9 at the third rotation speed. In this way, the rotation at the first rotation speed about the second center axis 91 caused by the electric motor 10 is decelerated using the spur gear mechanism 2 and the wave gear mechanism 3, and the output part 40 can be rotated about the first center axis 9 at the third rotation speed after the deceleration.

<1-2. Constitution of Torque Sensor>

Figure 5:
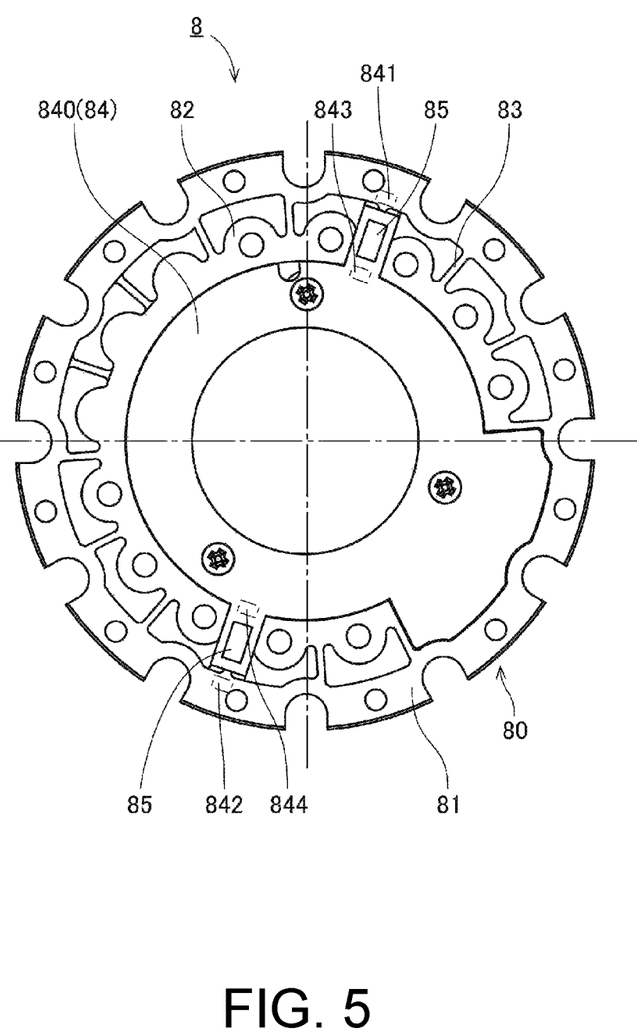
FIG. 5 is a plan view of a torque sensor of the first embodiment.

Subsequently, a constitution of the torque sensor 8 is described. FIG. 5 is a plan view of the torque sensor observed in the axial direction. In the following, in addition to FIG. 5, FIGS. 1 to 4 are also referred to as appropriate.

The torque sensor 8 annularly expands around the hollow shaft 4. In addition, the torque sensor 8 is connected to the casing 5 by screwing on the input side, and is connected to the fixed part 6 by screwing on the output side. As shown in FIG. 4 and FIG. 5, the torque sensor 8 includes a strain body 80, a sensor support part 84, and a plurality of strain sensors 85.

The strain body 80 is an elastically deformable member which has an annular first outer ring 81, an annular first inner ring 82, and a plurality of ribs 83. The first outer ring 81 is located at an end portion on the radial outside of the torque sensor 8 and is connected to the casing 5. In addition, the first inner ring 82 is located at an end portion on the radial inside of the torque sensor 8 and is connected to the fixed part 6. The plurality of ribs 83 are disposed to be spaced apart from each other in the peripheral direction. The plurality of ribs 83 respectively joins the first outer ring 81 and the first inner ring 82. Besides, the first outer ring 81 may be connected to the fixed part 6, and the first inner ring 82 may be connected to the casing 5. In other words, the first outer ring 81 may be connected to one of the casing 5 and the fixed part 6, and the first inner ring 82 may be connected to the other of the casing 5 and the fixed part 6.

The sensor support part 84 is a member which is adjacent to the plurality of ribs 83 in the axial direction and expands in a torus or an arc around the hollow shaft 4. In addition, the sensor support part 84 is connected to the first outer ring 81 respectively in a first position 841 in the first outer ring 81 and a second position 842 different from the first position 841 in the peripheral direction. In addition, the sensor support part 84 is connected to the first inner ring 82 respectively in a third position 843 located on the radial inside of the first position 841 in the first inner ring 82 and a fourth position 844 located on the radial inside of the second position 842 in the first inner ring 82. Thereby, the sensor support part 84 joins the first outer ring 81 and the first inner ring 82. Besides, the positions in the peripheral direction of the sensor support part 84 and each rib 83 may be different from each other or may overlap with each other. Besides, a surface 840 of the sensor support part 84 is a flat surface orthogonal to the first center axis 9. As described above, by arranging the sensor support part 84, the strain sensors 85 described later can be easily attached to the strain body 80.

In the speed reducer with an electric motor 1, for example, when the output part 40 is subjected to an external force including a torque around the first center axis 9, the external force is transmitted to the torque sensor 8 via the first bearing 35 and the fixed part 6. Specifically, the external force is transmitted to the first inner ring 82 of the strain body 80. Thereby, the strain body 80, the sensor support part 84, and the strain sensors 85 described later of the torque sensor 8 are displaced.

Besides, within the torque sensor 8, at least the sensor support part 84 is made of stainless steel. Thereby, a displacement amount of the sensor support part 84 caused by the above-described external force can be increased. Furthermore, within the torque sensor 8, the sensor support part 84 is made of stainless steel, and the strain body 80 having the first outer ring 81, the first inner ring 82, and the plurality of ribs 83 is made of metal higher in rigidity than stainless steel, and thereby the displacement can be concentrated on the sensor support part 84. Thereby, the displacement amount in the sensor support part 84, in particular the displacement amount in the radial direction between the first outer ring 81 and the first inner ring 82 can be further increased. In addition, the rigidity of the entire torque sensor 8 is maintained, and thus an influence of the speed reducer with an electric motor 1 on the rotation is suppressed.

The plurality of strain sensors 85 are respectively fixed to the surface 840 of the sensor support part 84 by adhesion. In addition, each of the plurality of strain sensors 85 is at least partially located in the radial direction between the first outer ring 81 and the first inner ring 82. Thereby, the external force applied to the output part 40 can be detected according to an output change of each strain sensor 85 generated by the displacement of the sensor support part 84.

Besides, a substrate (not shown) is further mounted on the torque sensor 8. The substrate is electrically connected to each of the plurality of strain sensors 85. In addition, wires (not shown) connected to the substrate are drawn outside of the torque sensor 8. Thereby, an output signal from each strain sensor 85 can be transmitted to an external detection device (not shown).

Besides, in the embodiment, two strain sensors 85 are fixed. As shown in FIG. 5, the two strain sensors 85 are respectively located in the radial direction between the first position 841 and the third position 843, and in the radial direction between the second position 842 and the fourth position 844. That is, the two strain sensors 85 are opposite to each other in the peripheral direction of the sensor support part 84 across the first center axis 9. Thereby, by comparing and further analyzing the output changes of the two strain sensors 85, the external force applied to the output part 40 can be distinguished into the force in the direction of the first center axis 9 and the torque about the first center axis 9 to be detected.

Besides, the number of the strain sensors 85 fixed to the sensor support part 84 may be three or more. In a case of three or more, for example, at least two of the plurality of strain sensors 85 may be disposed to be opposite to each other across the first center axis 9. In addition, three or more of the strain sensors 85 may be disposed to be equally spaced from each other in the peripheral direction. By using more strain sensors 85, the external force applied to the output part 40 can be finely distinguished into the force in the axial direction, the force in the radial direction, and the torque about the first center axis 9 to be detected.

Besides, in the strain body 80 of the torque sensor 8, at least a part of a surface opposite to the first gear 21 in the axial direction is blocked by a plate-like member 86. Thereby, the lubricating oil such as grease (not shown) retained in the contact section between the first gear 21 and the second gear 22 can be inhibited reaching the inside of the torque sensor 8. As a result, the lubricating oil can be inhibited from leaking to the outside of the speed reducer with an electric motor 1 via a cavity of the torque sensor 8.

Besides, the speed reducer with an electric motor 1 further includes an annular oil seal 87 around the hollow shaft 4. In addition, at least a part of the casing 5 and at least a part of the torque sensor 8 are bonded via the oil seal 87 in the axial direction. Thereby, the lubricating oil such as grease (not shown) retained in the contact section between the first gear 21 and the second gear 22 can be inhibited from reaching the inside of the torque sensor 8. As a result, the lubricating oil can be inhibited from leaking to the outside of the speed reducer with an electric motor 1 via the cavity of the torque sensor 8. Besides, the oil seal 87 may be disposed to be partially continuous from the plate-like member 86 or be integrated with the plate-like member 86. Furthermore, the oil seal 87 may be disposed across both the casing 5 and the plate-like member 86.

2. Variant

The exemplary embodiment of the present invention is described above, but the present invention is not limited to the above-described embodiment.

The flexible external gear 33 of the first embodiment has a so-called open structure, in which the flexible external gear 33 is formed by the tubular flexible tube part 331 that deforms corresponding to the rotation of the noncircular cam 32 and the flange part 332. However, the flexible external gear 33 may also have a so-called closed structure, in which the flexible external gear 33 is formed by the flexible tube part 331 that deforms corresponding to the rotation of the noncircular cam 32 and a disk part (not shown) that extends from the end portion of the flexible tube part to the radial inside. Furthermore, the flexible external gear 33 may be formed only by the flexible tube part 331 that deforms corresponding to the rotation of the noncircular cam.

In addition, in the first embodiment, the flexible external gear 33 is fixed to the output part 40, and the internal gear 34 is fixed to the fixed part 6. However, the flexible external gear 33 may be fixed to the fixed part 6, and the internal gear 34 may be fixed to the output part 40. In this case, the internal gear 34 engages with the flexible external gear 33 and relatively rotates due to the difference in number of teeth.

The torque sensor 8 of the first embodiment uses the plurality of strain sensors 85 to detect the external force which is applied to the output part 40 and is transmitted to the torque sensor 8 via the first bearing 35 and the fixed part 6. However, instead of using the plurality of strain sensors 85 or in addition to using the plurality of strain sensors 85, for example, sensors having other structures such as capacitive sensors may be used.

For example, high-strength metal is used in the material of each member constituting the above-described speed reducer with an electric motor. However, the material of each member is not necessarily limited to metal as long as the material can bear the load during use.

In addition, the shape of details of the speed reducer with an electric motor may be different from the shape shown in the drawings of this application. In addition, the elements that appear in the above-described embodiment or variant may be suitably combined within a range where contradiction does not occur.

This application claims the priority based on Japanese Patent Application No. 2017-27438 which is a Japanese patent application filed on Feb. 17, 2017, and all the content described in the Japanese patent application is incorporated herein.

INDUSTRIAL APPLICABILITY

The present invention can be applied to the speed reducer with an electric motor.

What is claimed is:

1. A speed reducer with an electric motor, comprising:
a hollow shaft that is hollow and extends in an axial direction around a first center axis;
a tubular casing that is directly or indirectly fixed to the hollow shaft and extends in the axial direction on a radial outside of the hollow shaft;
a fixed part that expands around the hollow shaft and is relatively stationary with respect to the casing;
an electric motor that generates a rotation motion with respect to a second center axis parallel to the first center axis on the radial outside of the hollow shaft;
a speed reduction mechanism that decelerates and transmits the rotation motion obtained from the electric motor;
an output part that is rotatably connected to the fixed part via a first bearing and rotates with respect to the first center axis at a rotation speed that has been decelerated by the speed reduction mechanism; and
a torque sensor that expands around the hollow shaft and is connected to the casing and the fixed part;
wherein the torque sensor comprises:
an elastically deformable strain body that has an annular first outer ring and an annular first inner ring; and
a plurality of strain sensors;
the first outer ring is located at an end portion on a radial outside of the torque sensor and is connected to one of the casing and the fixed part;
the first inner ring is located at an end portion on the radial inside of the torque sensor and is connected to the other of the casing and the fixed part; and
each of the plurality of strain sensors is at least partially located in a radial direction between the first outer ring and the first inner ring.

2. The speed reducer with an electric motor according to claim 1,
wherein at least two of the plurality of strain sensors are opposite to each other across the first center axis.

3. The speed reducer with an electric motor according to claim 1,
wherein the torque sensor further comprises
a sensor support part joining the first outer ring and the first inner ring;
wherein the sensor support part is connected to the first outer ring respectively in a first position in the first outer ring and a second position different from the first position in a peripheral direction; and
the sensor support part is connected to the first inner ring respectively in a third position located on a radial inside of the first position in the first inner ring and a fourth position located on a radial inside of the second position in the first inner ring; and
the plurality of strain sensors are respectively fixed to the sensor support part.

4. The speed reducer with an electric motor according to claim 3,
wherein at least the sensor support part within the torque sensor is made of stainless steel.

5. The speed reducer with an electric motor according to claim 3,
wherein the strain sensors are fixed to the sensor support part by adhesion.

6. The speed reducer with an electric motor according to claim 1,
wherein the speed reduction mechanism comprises:
a first gear that is fixed to a rotation shaft of the electric motor and rotates about the second center axis along with the rotation shaft;
a second gear that engages with the first gear and rotates about the first center axis;
a tubular part that extends in the axial direction around the hollow shaft and rotates about the first center axis and to which the second gear is fixed;
a noncircular cam that has an outer peripheral surface where a distance from the first center axis is not constant and the cam rotates along with the tubular part about the first center axis;
a flexible external gear that deforms corresponding to a rotation of the noncircular cam; and
an internal gear that is at east partially located on a radial outside of the flexible external gear;
wherein the flexible external gear and the internal gear engage with each other and relatively rotate due to a difference in number of teeth.

7. The speed reducer with an electric motor according to claim 6,
wherein the speed reduction mechanism comprises
a flexible second bearing that is interposed between the noncircular cam and the flexible external gear;
the second bearing has a second inner ring, a second outer ring, and a plurality of spheres interposed between the second inner ring and the second outer ring; and
the second inner ring and the noncircular cam are fixed to each other or are single members.

8. The speed reducer with an electric motor according to claim 1,
wherein the first bearing is a cross roller bearing.

9. The speed reducer with an electric motor according to claim 6,
wherein the flexible external gear comprises a tubular flexible tube part having a plurality of external teeth and a flange part that extends from an end portion of the flexible tube part to a radial outside.

10. The speed reducer with an electric motor according to claim 6,
wherein the flexible external gear comprises a tubular flexible tube part having a plurality of external teeth and a disk part that extends from an end portion of the flexible tube part to a radial inside.

11. The speed reducer with an electric motor according to claim 6,
wherein a lubricating oil is retained in a contact section between the first gear and the second gear in the speed reduction mechanism.

12. The speed reducer with an electric motor according to claim 1,
wherein at least a part of the casing and at least a part of the torque sensor are bonded via an annular oil seal in the axial direction.

13. The speed reducer with an electric motor according to claim 6,
wherein at least a part of a surface in the strain body opposite to the first gear in the axial direction is blocked by a plate-like member.

14. The speed reducer with an electric motor according to claim 2,
wherein the torque sensor further comprises
a sensor support part joining the first outer ring and the first inner ring;
wherein the sensor support part is connected to the first outer ring respectively in a first position in the first outer ring and a second position different from the first position in a peripheral direction; furthermore,
the sensor support part is connected to the first inner ring respectively in a third position located on a radial inside of the first position in the first inner ring and a fourth position located on a radial inside of the second position in the first inner ring; and
the plurality of strain sensors are respectively fixed to the sensor support part.

15. The speed reducer with an electric motor according to claim 4,
wherein the strain sensors are fixed to the sensor support part by adhesion.

16. The speed reducer with an electric motor according to claim 2,
wherein the speed reduction mechanism comprises:
a first gear that is fixed to a rotation shaft of the electric motor and rotates about the second center axis along with the rotation shaft;
a second gear that engages with the first gear and rotates about the first center axis;
a tubular part that extends in the axial direction around the hollow shaft and rotates about the first center axis and to which the second gear is fixed;
a noncircular cam that has an outer peripheral surface where a distance from the first center axis is not constant and the cam rotates along with the tubular part about the first center axis;
a flexible external gear that deforms corresponding to a rotation of the noncircular cam; and
an internal gear that is at least partially located on a radial outside of the flexible external gear;
wherein the flexible external gear and the internal gear engage with each other and relatively rotate due to a difference in number of teeth.

17. The speed reducer with an electric motor according to claim 3,
wherein the speed reduction mechanism comprises:
a first gear that is fixed to a rotation shaft of the electric motor and rotates about the second center axis along with the rotation shaft;
a second gear that engages with the first gear and rotates about the first center axis;
a tubular part that extends in the axial direction around the hollow shaft and rotates about the first center axis and to which the second gear is fixed;
a noncircular cam that has an outer peripheral surface where a distance from the first center axis is not constant and the cam rotates along with the tubular part about the first center axis;
a flexible external gear that deforms corresponding to a rotation of the noncircular cam; and
an internal gear that is at least partially located on a radial outside of the flexible external gear;
wherein the flexible external gear and the internal gear engage with each other and relatively rotate due to a difference in number of teeth.

18. The speed reducer with an electric motor according to claim 4,
wherein the speed reduction mechanism comprises:
a first gear that is fixed to a rotation shaft of the electric motor and rotates about the second center axis along with the rotation shaft;
a second gear that engages with the first gear and rotates about the first center axis;

a tubular part that extends in the axial direction around the hollow shaft and rotates about the first center axis and to which the second gear is fixed;

a noncircular cam that has an outer peripheral surface where a distance from the first center axis is not constant and the cam rotates along with the tubular part about the first center axis;

a flexible external gear that deforms corresponding to a rotation of the noncircular cam; and an internal gear that is at least partially located on a radial outside of the flexible external gear;

wherein the flexible external gear and the internal gear engage with each other and relatively rotate due to a difference in number of teeth.

19. The speed reducer with an electric motor according to claim 5, wherein the speed reduction mechanism comprises:

a first gear that is fixed to a rotation shaft of the electric motor and rotates about the second center axis along with the rotation shaft;

a second gear that engages with the first gear and rotates about the first center axis;

a tubular part that extends in the axial direction around the hollow shaft and rotates about the first center axis and to which the second gear is fixed;

a noncircular cam that has an outer peripheral surface where a distance from the first center axis is not constant and the cam rotates along with the tubular part about the first center axis;

a flexible external gear that deforms corresponding to a rotation of the noncircular cam; and an internal gear that is at least partially located on a radial outside of the flexible external gear;

wherein the flexible external gear and the internal gear engage with each other and relatively rotate due to a difference in number of teeth.

20. The speed reducer with an electric motor according to claim 2, wherein the first bearing is a cross roller bearing.

\* \* \* \* \*